United States Patent [19]

Ehrlich

[11] Patent Number: 5,538,330
[45] Date of Patent: Jul. 23, 1996

[54] AXLE VENT

[75] Inventor: Rodney P. Ehrlich, Monticello, Ind.

[73] Assignee: Wabash National Corporation, Lafayette, Ind.

[21] Appl. No.: 341,414

[22] Filed: Nov. 17, 1994

[51] Int. Cl.⁶ .................................................. B60B 35/00
[52] U.S. Cl. ...................... 301/124.1; 301/108.1
[58] Field of Search .......................... 301/108.1, 124.1, 301/105.1, 108.2, 108.3, 108.4, 108.5; 384/489

[56] References Cited

U.S. PATENT DOCUMENTS

| | | | |
|---|---|---|---|
| 3,003,834 | 10/1961 | Pendleton | 301/108.3 X |
| 3,037,818 | 6/1962 | Scheez | 301/124.1 |
| 5,098,168 | 3/1992 | Johnson | 301/124.1 |
| 5,195,807 | 3/1993 | Lederman | 301/108.3 X |

*Primary Examiner*—Russell D. Stormer
*Attorney, Agent, or Firm*—Trexler, Bushnell, Giangiorgi & Blackstone

[57] ABSTRACT

An apparatus for mounting a wheel on a vehicle such as a trailer includes a hollow, non-rotatable axle, a wheel hub having a cavity therein and a valve or venting structure positioned between the axle and the wheel hub cavity. The wheel hub has an end connected to the hollow axle and its other end is sealed by an end cap. The cavity within the wheel hub has a volume of air which is substantially less than the volume of air within the axle. The valve is formed by a flexible membrane or diaphragm having a slit therein. The valve opens and closes in response to pressure differentials created between the wheel hub cavity and the axle by the membrane flexing to open or close the slit.

12 Claims, 1 Drawing Sheet

5,538,330

AXLE VENT

BACKGROUND OF THE INVENTION

This invention is generally directed to an apparatus for mounting a wheel on a vehicle such as a trailer or the like. More particularly, the invention contemplates a novel valve or venting structure which prevents the build-up of pressure within the wheel mounting apparatus.

Apparatus for mounting wheels on trailers are well-known in the art. Such apparatuses generally include a hollow axle and wheel bearings lubricated by a bath of oil or light grease contained in a cavity defined by a hollow wheel hub. A slip ring type seal is provided between the wheel hub and the axle to prevent oil from leaking out at one end of the wheel hub and an end cap is provided at the other end of the wheel hub in order to contain the oil therein.

A small hole or a sintered metal plug is provided through the end cap for preventing the build-up of pressure formed under heating conditions of operations within the wheel hub which might force oil through the slip ring seal. The small hole or sintered plug, however, are subject to being blocked with grease or oil so as to become inoperative.

The present invention presents a novel valve or venting structure for an axle which is used to mount a wheel on a vehicle such as a trailer that is intended to overcome this problem and other inherent problems in the prior art as well as to present several other advantages and improvements.

OBJECTS AND SUMMARY OF THE INVENTION

A general object of the present invention is to provide a novel venting structure which substantially prevents the build-up of pressure within a vehicle wheel mounting apparatus due to heating conditions which occur during operation of the vehicle.

An object of the present invention is to provide a venting structure for a wheel mounting apparatus venting system having a novel structure that effectively minimizes the possibility of the venting structure becoming inoperable.

Briefly, and in accordance with the foregoing, the present invention discloses an apparatus for mounting a wheel on a vehicle such as a trailer. The apparatus generally includes a hollow, non-rotatable axle and wheel bearings lubricated by a bath of oil or light grease contained in a cavity defined by a hollow wheel hub. A slip ring type seal is provided between the wheel hub and the axle to prevent oil from leaking out at one end of the wheel hub. A closed end cap is provided at the other end of the wheel hub in order to contain the oil therein. The volume of the cavity in the wheel hub is substantially less than the volume within the hollow axle.

A valve is positioned between the hollow axle and the wheel hub cavity and is formed from a flexible membrane having a slit therein. The slit in the valve membrane opens and closes in response to pressure differentials created between the volume of air in the wheel hub cavity and the volume of air which is within the axle in order to prevent the build-up of pressure due to heating conditions of operations within the wheel hub cavity which might force oil through the slip ring seal. The valve opens and closes by the membrane flexing to open or close the slit.

The valve may further include a generally rigid member which encircles the flexible membrane and which generally conforms to the shape of the interior of the hollow axle. A flexible seal, such as a flexible flap, may be provided along the outer surface of the member for sealing the member to the interior of the axle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
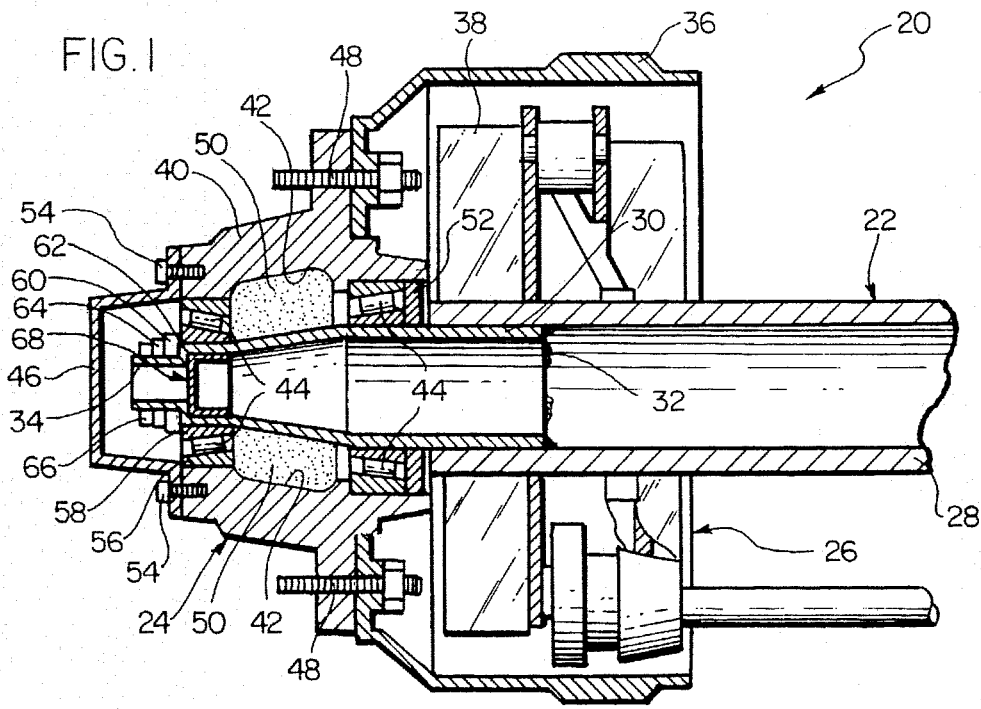
FIG. 1 is a cross-sectional view of a wheel mounting apparatus which incorporates the features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In FIG. 1, and as used in accordance with the present invention, an apparatus 20 for mounting a wheel (not shown) on a vehicle, such as a trailer or the like, is shown. The apparatus generally includes an axle 22, a wheel hub assembly 24 and a brake assembly 26.

The axle 24 is fixedly mounted on the trailer body by suitable means and is formed from a hollow tube 28 having ends (only one of which is shown) having a hollow spindle 30 attached thereto by, for example, a weld 32. The spindle 30 is a hollow, tapered member having a threaded end 34. The hollow tube 28 and spindle 30 of the axle 22 define a volume therein. The axle 22 is formed from a suitable strong rigid material.

The brake assembly 26 is of known construction and as such is not described in detail herein. The brake assembly 26 is mounted on the axle 22 and generally includes a brake drum 36 and a brake shoe 38.

The wheel hub assembly 24 is mounted on the end of the axle 22 and generally surrounds the spindle 30. The wheel hub assembly 24 includes a wheel hub 40 having a space, chamber or cavity 42 therein, a plurality of wheel bearings 44 and an end cap 46. The wheel hub 40 is attached to the brake drum 36 by suitable known means, such as bolts 48.

A bath of oil or light grease 50 is contained within the wheel hub cavity 42. The oil or light grease 50 lubricates the wheel bearings 44 and the axle 22 during operation of the vehicle. The cavity 42 in the wheel hub 40 defines a volume which is substantially less than the volume within the hollow axle 22.

A slip ring type seal 52 is provided between the wheel hub 40 and the axle 22 to prevent the oil or light grease 50 from leaking out from the cavity 42 at the intersection of the wheel hub 40 and the axle 22. The end cap 46 is a one-piece uninterrupted member, except for apertures through which the end cap 46 is attached to the end of the wheel hub 40 by suitable means, such as bolts 54. The end cap 46 seals the outer end of the hub cavity 42 and prevents the oil or light grease 50 from leaking out of the end of the wheel hub assembly 24.

The wheel bearings 44 are mounted between the wheel hub 40 and the spindle 30 by an inner bearing cup 56 and an inner bearing cone 58. An inner adjusting nut 60 is threaded onto the threaded end 34 of the spindle 30 and bears against the inner bearing cone 58 and a shoulder 62 formed in the spindle 30 to position the wheel bearings 44. The adjusting nut 60 is locked onto the spindle 30 by threading a lockwasher 64 and an outer jam nut 66 on the threaded end 34.

The wheel bearings 44 allow the wheel hub assembly 24 and the brake drum 36 to rotate relative to the fixed axle 22. The bearings 44 are mounted on both sides of the cavity 42 and are lubricated by the bath of oil or light grease 50 contained within the cavity 42.

During operation of the vehicle, as the wheel, wheel hub 40, end cap 46 and brake drum 36 turn, heat is generated. This causes the air within the wheel hub cavity 42 to expand and thus the pressure to increase. Also during operation, some oil or grease 50 may leak into the end cap 46 through the space between the inner bearing cup 56 and cone 58 where the wheel bearings 44 are located.

Figure 2:
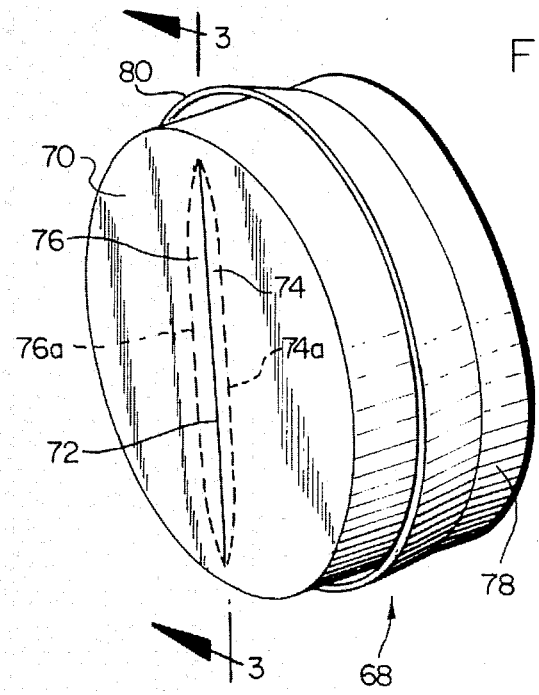
FIG. 2 is a perspective view of a novel valve which is used in the wheel mounting apparatus in FIG. 1 showing an exaggerated open configuration of the valve in phantom lines.
Figure 3:
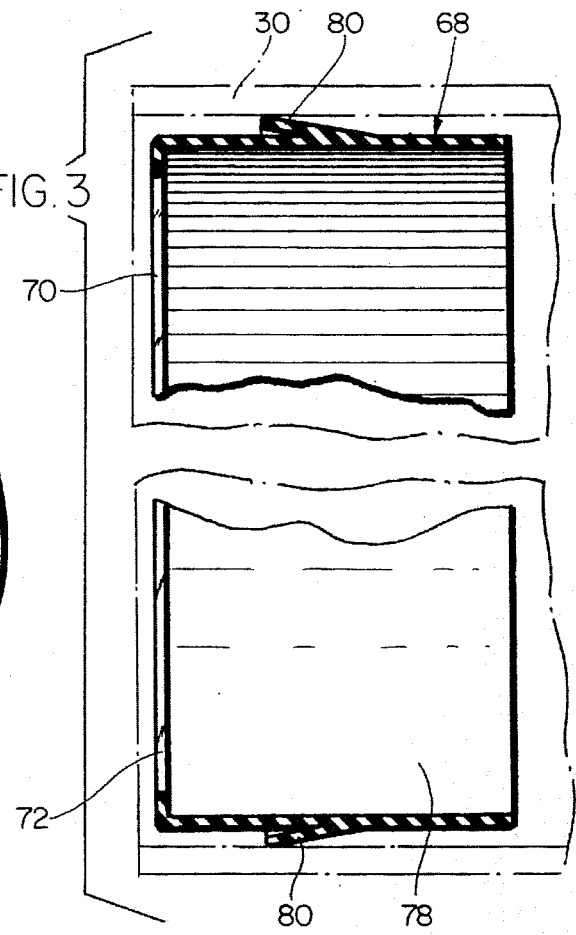
FIG. 3 is a partial cross-sectional view of the novel valve along line 3—3 in FIG. 2.

In order to prevent the build-up of pressure created under heating conditions of operations within the wheel mounting apparatus 20, a novel valve or venting structure 68, as shown clearly in FIGS. 2 and 3, is provided. The valve 68 is positioned within the axle 22 and may be positioned within the spindle 30. The valve or venting structure 68 is located between the volume of air within the hollow axle 22 and the wheel hub cavity 42. The valve or venting structure 68 opens and closes in response to pressure differentials created between the volume of air within the axle 22 and the volume of air within the cavity 42 during operation of the vehicle.

The valve 68 is a soft, flexible membrane or diaphragm 70 that is made of a suitable material such as a soft flexible polymer, for example, neoprene, urethane, latex or the like. A small, narrow slit 72 is provided within the diaphragm 70 to provide for opening and closing the valve 68 in response to pressure differentials created during operation of the vehicle. The slit 72 is defined by abutting edges 74, 76 of the membrane 70.

When the valve or venting structure 68 is closed, the abutting edges 74, 76 of the membrane 70 lie in an abutting position as shown by the solid line in FIG. 2. When the valve or venting structure 68 is open, the edges 74a, 76a of the slit 72 are apart, as shown in phantom lines in FIG. 2 which are exaggerated for illustrative purposes only. To open the valve 68, the membrane 70 flexes either concavely or convexly thus parting the edges 74, 76. The slit 72 is capable of passing or venting air, but the slit 72 is sufficiently narrow so as to preclude any appreciable passage of oil or grease 50 which may have accumulated in the end cap 46. The slit 72 also prevents the passage of any rust or other foreign material that may have accumulated inside the axle 22 into the wheel hub assembly 24 where the rust or foreign material might foul the bearings 44.

If oil, grease or dirt accumulates on the valve 68, the slit 72 in the resilient diaphragm 70 effectively minimizes the possibility of the valve 68 becoming plugged or inoperable. If there is any build-up in pressure because of an initially plugged slit 72, the diaphragm 70 flexes to a greater degree to open the slit 72 wider.

The valve 68 may further include a generally rigid member 78 encircling the flexible membrane or diaphragm 70.

The member 78 is made of a suitable material, such as a relatively rigid plastic. The exterior shape of the member 78 generally conforms to the interior shape of the hollow axle 22.

A flexible sealing member 80 may be provided along the outer surface of the rigid member 78 to provide for a tight seal or fit between the member 78 and the interior of the axle 22 to minimize or prevent any dirt, rust or oil from passing around the perimeter of the valve 68. The sealing member 80 may be a flexible flap along the outer perimeter of the member 78 as shown in FIGS. 2 and 3. Alternatively, the sealing member 80 may be a bead, such as an annular bead, which encircles the member 78 along its outer perimeter.

Now that the specifics of the novel valve 68 and associated wheel mounting apparatus 20 have been described in detail, the operation of the valve 68 will be described. As the wheel, wheel hub assembly 24 and brake drum 36 turn relative to the axle 22, heat is generated. This causes the air within the wheel hub cavity 42 to expand and thus the pressure to increase. Since the volume of air within the axle 22 is relatively cool, a pressure differential is created.

The valve 68 opens in response to the pressure differential by flexing inwardly toward the axle 22 and causing the slit 72 to open, as shown in exaggerated form by the phantom lines in FIG. 2. Air from the wheel hub cavity 42 passes or vents into the axle 22 until the pressure between the cavity 42 and the volume of air within the axle 22 has been equalized. Once equalization is achieved, the valve 68 closes by the edges 74, 76 of the slit 72 in the membrane 70 abutting each other as shown by the solid line in FIG. 2. Thus, the axle 22 provides an effective space into which the excess air pressure in the wheel hub assembly 24 can be vented and this prevents the build-up of any appreciable pressure in the wheel hub cavity 24 since the volume of air within the axle 22 is many times that of the cavity 24. The axle 22 acts as a heat sink and dissipates the heat into the atmosphere. When the operation of the trailer is stopped and the wheel hub assembly 24 is allowed to cool, the air pressure in the wheel hub assembly 24 may decrease to a level below that of the air in the axle 22. In this event, the valve diaphragm 68 will flex outwardly to open the slit 72 and permit the air pressure within the wheel hub cavity 42 and the axle 22 to equalize.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A wheel mounting apparatus comprising:
   an axle comprising a hollow tube defining a volume therein a hub mounted on said axle and defining a chamber and a valve positioned at an end of said tube between said chamber and said volume, said valve comprising a flexible membrane having opening and closing means therein for opening and closing said valve in response to pressure differentials created between said chamber and said volume on each side of said valve.

2. A wheel mounting apparatus as defined in claim 1, wherein said opening and closing means comprises a slit in said flexible membrane defined by abutting edges of said membrane.

3. A wheel mounting apparatus as defined in claim 2, wherein said valve further includes a generally rigid member encircling said flexible membrane, said member generally conforming to the shape of the interior of said hollow tube.

4. A wheel mounting apparatus as defined in claim 3, wherein said valve further includes flexible sealing means along the outer surface of said generally rigid member for sealing said generally rigid member to said interior of said hollow tube.

5. A wheel mounting apparatus as defined in claim 4, wherein said sealing means comprises a flexible flap along the outside perimeter of said generally rigid member.

6. A wheel mounting apparatus as defined in claim 2, wherein said membrane is formed from a soft, flexible polymer material.

7. A wheel mounting apparatus comprising:

an axle comprising a hollow tube defining a volume therein;

a wheel hub having a first end connected to an end of said hollow tube and a second end being sealed, said hub having a cavity therein defining a volume, said volume of said cavity in said hub being substantially less than the volume within the tube; and a valve positioned between said tube and said hub, said valve opening and closing in response to pressure differentials created between the cavity in said wheel hub and said hollow tube.

8. A wheel mounting apparatus as defined in claim 7, wherein said valve comprises a flexible membrane having opening and closing means thereon for opening and closing said valve in response to said pressure differentials.

9. A wheel mounting apparatus as defined in claim 8, wherein said opening and closing means comprises a slit in said flexible membrane defined by abutting edges of said membrane.

10. A wheel mounting apparatus as defined in claim 9, wherein said valve further includes a generally rigid member encircling said flexible membrane, said generally rigid member generally conforming to the shape of the interior of said hollow tube.

11. A wheel mounting apparatus as defined in claim 10, wherein said valve further includes flexible sealing means along the outer surface of said generally rigid member for sealing said generally rigid member to said interior of said hollow tube.

12. A wheel mounting apparatus comprising an axle comprising a hollow tube; a wheel hub attached to an end of said axle, an end cap secured to said wheel hub; said wheel hub and said end cap defining a chamber therein; and a vent valve for said chamber, said valve comprising a flexible membrane having opening and closing means thereon for opening and closing said valve in response to pressure in said chamber, said valve being positioned at an end of said tube, said valve opening and closing in response to pressure differentials created between the chamber and the hollow tube.

* * * * *